United States Patent [19]

Carpenter et al.

[11] 3,797,449
[45] Mar. 19, 1974

[54] TRIM INDICATOR AND CIRCUIT THEREFOR

[75] Inventors: William R. Carpenter; Richard M. Sponaas, both of Muskegon, Mich.

[73] Assignee: Medallion Instruments, Inc., Spring Lake, Mich.

[22] Filed: Nov. 8, 1971

[21] Appl. No.: 196,325

[52] U.S. Cl. .................................. 115/41 HT
[51] Int. Cl. .................................. B63h 5/12
[58] Field of Search ......... 115/41 R, 41 HT, 34, 35; 340/177 R, 210; 324/57, 76, 110, 105; 307/318, 297

[56] References Cited
UNITED STATES PATENTS

| | | | |
|---|---|---|---|
| 2,871,701 | 2/1959 | Knudsen | 324/105 |
| 3,207,984 | 9/1965 | Tolliver | 324/105 |
| 3,495,159 | 2/1970 | Smith | 324/105 |
| 3,641,965 | 2/1972 | Schmiedel | 244/41 HT |
| 3,671,952 | 6/1972 | Simms, Jr. | 340/177 R |
| 3,237,186 | 2/1966 | Whelpley et al. | 340/177 R X |
| 3,521,589 | 7/1970 | Kemp | 115/35 X |
| 3,054,095 | 9/1962 | Heller | 340/210 X |
| 2,745,087 | 5/1956 | Dickinson | 340/177 R |
| 2,599,258 | 6/1952 | Hoare | 340/210 X |

Primary Examiner—Duane A. Reger
Assistant Examiner—Charles E. Frankfort
Attorney, Agent, or Firm—Price, Heneveld, Huizenga & Cooper

[57] ABSTRACT

A trim or tilt angle-indicating system for providing a visual indication of the position angle of the outdrive unit in an inboard-outboard boat propulsion system including an electrical meter coupled in a bridge circuit supplied power by a regulated voltage supply. One leg of the bridge circuit comprises a variable resistor which has a wiper arm coupled to the outdrive unit. As the trim angle of the outdrive is varied, the resistance of the variable resistor changes, to thereby unbalance the bridge circuit. The resulting electrical current flow through the meter deflects a meter needle to indicate that the trim angle of the outdrive unit on a dial is associated with the meter.

4 Claims, 2 Drawing Figures

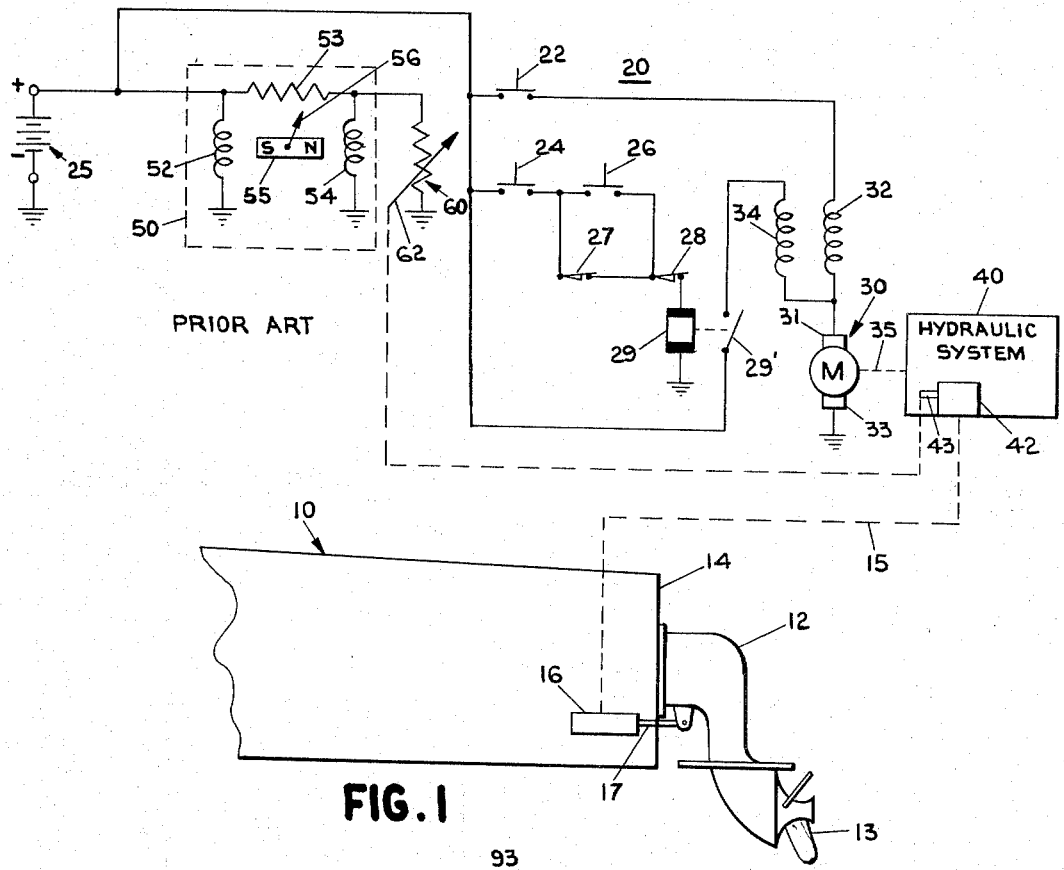
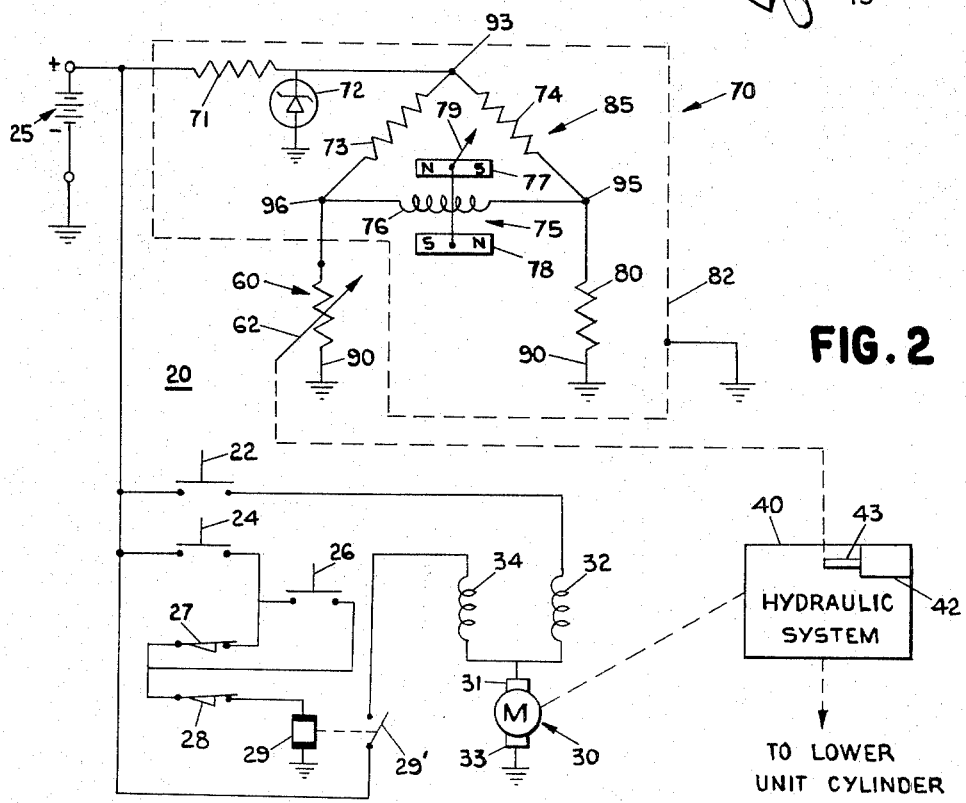

TRIM INDICATOR AND CIRCUIT THEREFOR

BACKGROUND OF THE INVENTION

The present invention relates to a trim (i.e., tilt) angle indicator and circuit therefor to indicate the trim angle of an outdrive unit for an inboard-outboard boat.

In boats employing an inboard-mounted drive motor and an outboard-mounted lower unit (outdrive), which are commonly known as inboard-outboard boats, the outdrive unit is relatively heavy and inaccessible or unwieldy as compared with an outboard motor, most of which can be manually raised by pivoting the motor about the transom of the boat. Thus, with the inboard-outboard system, an electrically operated hydraulic unit is provided for raising and lowering the outdrive unit. Frequently, an electrical meter is also provided such that the trim angle of the outdrive unit (i.e., the angle of the unit with relation to the surface of the water) is, in one manner or another, indicated to the operator at the pilot house or dashboard of the boat.

In some of the known instruments for indicating the trim angle of the lower unit, a sensing and drive circuit for the electrical meter movement includes a pair of coils coupled to a sensing resistor. The resistance of the sensing resistor is varied as a function of the trim angle of the outdrive unit, by mechanically connecting the wiper arm of the variable resistor to the outdrive. The meter for indicating the trim angle is coupled directly to the electrical supply system of the boat (commonly a storage battery) which is also used to supply current to the electrical motor for raising and lowering the outdrive unit. When the outdrive unit is raised, the electrical drive motor, which requires a considerable amount of current to raise the heavy outdrive unit, causes the battery voltage to decrease. Since the battery supplies the trim angle indicator, the meter will under these circumstances indicate an erroneous trim angle, due to the varying supply voltage. Additionally, since the trim angle indicator is coupled directly to the battery of the boat, other electrical disturbances such as inductive voltage spikes caused by the operation of accessories or other electrical equipment on the boat affects the reading provided by the trim indicator and can cause erroneous or spurious readings.

SUMMARY OF THE PRESENT INVENTION

The trim-indicating meter system of the present invention eliminates, and is free of the sources of erroneous indication found in prior indicating systems and at the same time is more sensitive and accurate than the latter. In accordance with the present invention, the indicating meter is connected in a bridge circuit and, furthermore, such circuit is supplied operating power from a regulated voltage source. The supply for the meter instrument therefore does not fluctuate with changing battery voltage due to current drawn by the drive motor for the outdrive, or due to the actuation of other electrical equipment on the boat. A sensing resistor having a resistance which varies in response to the position of the lower unit is coupled in one leg of the bridge circuit to vary the current through the indicating meter as the trim angle of the outdrive unit is varied. A pointer needle associated with the meter provides an accurate trim angle indication on an associated dial.

BRIEF DESCRIPTION OF THE DRAWINGS

FIG. 1 is an electrical circuit diagram in schematic form showing the control unit for raising and lowering an outdrive unit by an electrically operated hydraulic system. FIG. 1 also shows a prior art indicating system used therewith, together with a pictoral representation of a boat with an outdrive unit; and FIG. 2 is an electrical circuit diagram in schematic form showing the control circuit for an electrically operated hydraulic outdrive and showing the trim angle indicator and circuit of the present invention.

DETAILED DESCRIPTION OF A PREFERRED EMBODIMENT

In FIG. 1 there is shown an inboard-outboard boat 10 having an inboard engine (not shown) and an outdrive unit 12 coupled to the engine and mounted to the transom 14 of boat 10. Unit 12 includes a propeller 13 driven by the inboard engine for propelling the boat through the water. The outdrive 12 is pivotally coupled to the transom 14 such that it can be raised or lowered by a hydraulic cylinder 16 which is normally mounted on the hull or transom, or within the engine compartment of the boat 10. The hydraulic cylinder 16 has a movable shaft or ram 17 coupled to the outdrive unit 12 such that as the shaft is extended or retracted the outdrive will be raised and lowered. Additionally, the lower unit 12 or at least its propeller section can be turned from side to side to control the direction of boat travel.

When the boat is in motion, it is frequently desired to vary the angular position (trim angle) of the outdrive unit 12 to achieve maximum performance of the boat. Also, when the boat is beached or is going through shallow water, the outdrive unit 12 must be in a raised or partially raised position. The raising and lowering of unit 12 is achieved by actuating the hydraulic cylinder 16 by a control circuit such as that shown at 20 in FIG. 1. Hydraulic pressure is supplied to the cylinder 16 by means of a coupling such as a hose indicated by the dotted line 15 between cylinder 16 and the hydraulic system 40 in FIG. 1. It is to be understood that the control circuit 20, the motor 30 and system 40 are mounted within the hull of boat 10. The hydraulic system 40 includes a hydraulic pump mechanically driven by the electrical motor 30.

The electrical control system 20 comprises a first push button switch 22 having one terminal coupled to a positive terminal on a battery 25 and a terminal remote from this junction coupled to a first motor winding 32 associated with the motor 30. A second switch 24 similarly has one terminal coupled to the positive terminal of battery 25 and a terminal remote from this junction coupled to a third push button switch 26. Parallel with the switch 26 as shown is a limit switch 27. The terminal of switch 26 remote from its junction with switch 24 is coupled to one terminal of a limit switch 28 having a terminal remote from its junction with push button switch 26 coupled to one terminal of a relay coil 29. The terminal of relay 29 remote from switch 28 is coupled to a reference potential such as ground as shown in FIG. 1. The negative terminal of battery 25 is likewise coupled to ground.

Relay 29 has a pair of normally open contacts 29' having one terminal coupled to the positive terminal of battery 25 and the other terminal coupled to a second motor winding 34 associated with motor 30. Windings 32 and 34 of motor 30 are coupled to a first terminal 31 on the motor 30 which has a second terminal 33 coupled to ground. Motor 30 has an armature shaft which is mechanically coupled to the hydraulic pump in the hydraulic system 40, as indicated by the dotted line 35 in FIG. 1.

An indicator 50 of a type presently in use includes a meter having a first coil 52 coupled from the positive terminal of battery 25 to ground, and a second coil 54 coupled to the positive terminal of battery 25 by means of a resistor 53. The end of coil 54 remote from the junction to resistor 53 is returned to ground. The meter includes a permanent magnet 55 disposed in physical proximity to the coils 52 and 54 such that a varying magnetic field developed by coils 52 and 54 due to current therethrough will cause the permanent magnet 55 to rotate. A sensing resistor 60 comprising a rheostat or potentiometer with a wiper arm 62 is coupled in parallel with coil 54. The wiper arm 62 is mechanically coupled to a movable element within the hydraulic system 40 as indicated by the dashed lines in the figure. As the outdrive unit is tilted, the movable element causes wiper arm 62 to move to vary the resistance of resistor 62 so as to change the direction of the magnetic field produced by coils 52 and 54 due to the changing current division between coils 52 and 54. A meter needle 56 is coupled to the magnet 55 and moves therewith to provide an indication between the meter needle 56 and a dial scale (not shown) calibrated to show the trim angle of the outdrive 12.

Limit switch 27 is normally closed and opens only when the outdrive unit 12 is raised to a predetermined maximum position. Switch 26 can be actuated to override this limit switch if desired; however, the limit switch 28 is an absolute end-of-travel limit switch which opens only when the outdrive unit 12 is in a fully raised position to prevent damage to the outdrive unit 12 by further actuation of the motor 30. To raise the outdrive, the push button switch 24 is actuated. With the limit switches 27 and 28 in their normally closed position relay 29 is actuated through the closed switch 24 and switches 27 and 28 such that the contacts 29' associated with the relay 29 are closed. The closing of relay contacts 29' couples the motor winding 34 to battery 25. The resulting current through motor winding 34 causes the motor shaft 35 to rotate in the direction to extend the hydraulic ram shaft 17 of the hydraulic cylinder 16, thereby raising the outdrive 12. It is to be noted that relay 29 is required to raise the out-drive unit since the switches 34, 27, and 28 cannot carry the relatively large current drawn through winding 34 of motor 30 to raise the unit 12.

As the outdrive unit 12 is raised, the resistance of resistor 60 increases thereby increasing the current in coil 54 of the indicator 50. The wiper arm 62 can be coupled to any convenient location in the hydraulic system or directly to the outdrive unit 12. It has been convenient to provide a small hydraulic cylinder 42 having a movable shaft 43 that tracks the raising and lowering of the outdrive unit 12 and to which the wiper arm 62 is coupled.

To lower the outdrive 12, switch 22 is actuated, closing the contacts to couple motor winding 32 to the battery 25. No relay is needed for winding 32 since considerably less current is drawn when the unit 12 is lowered. When lowering the outdrive 12, the resistance of resistor 60 decreases and, therefore, the current in coil 54 of the indicator 50 decreases to cause the needle 56 mounted on the permanent magnet 55 to change position in a direction corresponding to the movement of the outdrive unit 12. It is noted that the internal resistance of coil 52 is sufficient to prevent damage of the meter.

Since the indicator 50 is directly coupled to the battery 25, battery voltage fluctuations, as for example as a result of the actuation of motor winding 34 when the outdrive unit 12 is raised, adversely affect the operation of the indicator 50, tending to cause erroneous and spurious readings. Similarly, once the outdrive-elevating push button switch 24 is released, the induced reverse voltage spike caused by the interruption of current through coil 34 is applied directly to the indicator 50 since the relay contacts 29' cannot open as quickly as the voltage spike is developed. This induced voltage spike further adversely affects the operation of the prior art indicator 50 of FIG. 1.

Referring now to FIG. 2, there is shown an improved indicating unit 70 which can be used with a control circuit substantially the same as that shown in FIG. 1. Circuit elements of FIG. 2 which are the same as that shown in FIG. 1 are labeled with identical reference numerals. The control circuit 20 of FIG. 2 operates in the same manner as circuit 20 of FIG. 1 to raise and lower the outdrive 12 (not shown in FIG. 1).

The indicating unit 70 includes a voltage regulator coupled to the battery 25 comprising a current-limiting resistor 71 having one end coupled to the positive terminal battery 25 and an end remote therefrom coupled to the cathode of a zener diode 72. The anode of the zener diode is returned to ground, as is the negative terminal of battery 25. Resistor 71 is chosen to bias the zener diode 72 in an avalanche mode of operation such that the voltage across the diode 72 will remain constant within the ranges of voltage fluctuations of battery 25. A bridge circuit 85 comprises four resistors 73, 74, 60 and 80. Resistors 73 and 74 are joined at a first input terminal 93 and resistors 60 and 80 are joined at a second input terminal 90 such as ground. Resistor 60 is variable, having a wiper arm 62 coupled to a sending unit such as movable element 43 of a small hydraulic cylinder 42 in the hydraulic system 40. The element 43 accurately tracks the position of (i.e., follows in a predetermined relationship) outdrive unit 12. Thus, as the outdrive 12 moves the wiper arm 62 is correspondingly moved, causing the resistance of resistor 60 to vary to provide a resistance which is a function of the outdrive 12 position.

An indicating meter 75 is coupled from a first bridge terminal 95 at the junction of resistors 74 and 80 to a second bridge terminal 96 at the junction of resistors 73 and 60.

The meter 75 comprises a dual magnet type of meter, actuated by a single coil 76 and including permanent magnets 77 and 78, to which is mechanically coupled a meter needle 79. This type of meter movement is insensitive to external magnetic fields and responds only to the magnetic field set up by the current flowing through coil 76, to provide a needle deflection corresponding to the trim angle of the outdrive unit 12.

The resistance values of resistors 73 and 74 are identical and resistance of resistor 80 is chosen such that it will match the nominal resistance of resistor 60 when the outdrive unit 12 is at its midpoint. In this position of unit 12, the bridge 85 is balanced and no current flows through meter 75. When the resistance of resistor 60 varies as the outdrive unit 12 is raised or lowered, the bridge will become unbalanced thereby causing current to flow through the indicating meter 75 in a direction from terminal 95 to terminal 96 or from terminal 96 to 95. Since the operating power for bridge 85 is a regulated voltage source, the meter 75 will not respond to battery voltage fluctuations caused by the actuation of the raising and lowering windings 34 and 32, respectively of the outdrive unit 12 or actuation of other electrical equipment on the boat. Thus only variations in the position of outdrive 12 will deflect the needle 79 of meter 75, which therefore accurately indicates the position of unit 12.

Electrical circuit parameters which have been employed in a specific preferred working embodiment include the following: resistor 71 — 30 ohms; diode 72 — 6.8 volt zener; resistor 73 — 220 ohms; resistor 74 — 220 ohms; resistor 60 — 0 to 150 ohms, linear wound, the zero end corresponding to the lowered position of outdrive unit 12; resistor 80 — 75 ohms; and the resistance of coil 76 within meter 75 — 1.5 ohms; battery 25 — 12 volts DC. The components of the indicator 70, with the exception of the remotely-mounted resistor 60, can be mounted within the case 82 of the meter 75 which, as shown in FIG. 2, can be grounded to shield the components.

In accordance with the foregoing, the present invention provides an indicating system for the particular type of application described which eliminates the operational problems and short-comings of systems presently available or in use and which provides greatly improved results. It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows:

1. For use in marine craft having an outboard-type drive train including an outdrive unit with an electrically actuated system for raising and lowering the outdrive unit to change its trim angle, a trim angle indicator including a meter movement having a meter needle for indicating the trim angle of the outdrive unit, said indicator comprising: a voltage regulator having input terminals for coupling said regulator to a source of operating potential, and having output terminals; a bridge network including a variable resistor having a movable wiper arm for varying the resistance of said variable resistor, said bridge having first and second input terminals coupled to said output terminals of said voltage regulator, said bridge also having first and second output terminals; said meter movement coupled to said first and second output terminals of said bridge; and means for moving said wiper arm of said variable resistor as the trim position of the outdrive unit changes, to vary the resistance of said variable resistor thereby causing an electrical current to flow through said meter movement and thereby causing the latter to indicate the trim position of the outdrive unit.

2. The indicator as defined in claim 1 wherein said means for moving said wiper arm of said variable resistor comprises: a movable element in said system for raising and lowering the outdrive unit and a mechanical coupling means for connecting said wiper arm to said movable element such that said wiper arm tracks the position of the outdrive unit.

3. The indicator as defined in claim 1 wherein said voltage regulator comprises a zener diode coupled between said output terminals of said voltage regulator and means biasing said diode in the avalanche mode of operation when said voltage regulator is coupled to a source of operating potential.

4. The indicator as defined in claim 3 wherein one of said input terminals of said voltage regulator is coupled to one of said output terminals of said voltage regulator and wherein said means biasing said diode comprises a current limiting resistor coupled between the other of said input terminals and the other of said output terminals, such that said resistor biases said zener diode in an avalanche mode of operation and limits current flowing through said diode.

* * * * *